3 Sheets—Sheet 1.

L. TOWNE.

Machine for Making Ornamental Chains.

No. 928. Reissued March 13, 1860.

Witnesses:
James A. Rafsky
W. B. Rhodes

Inventor:
Lansdale Towne

N. PETERS, Photo-Lithographer, Washington, D. C.

3 Sheets—Sheet 2.
L. TOWNE.
Machine for Making Ornamental Chains.
No. 928. Reissued March 13, 1860.
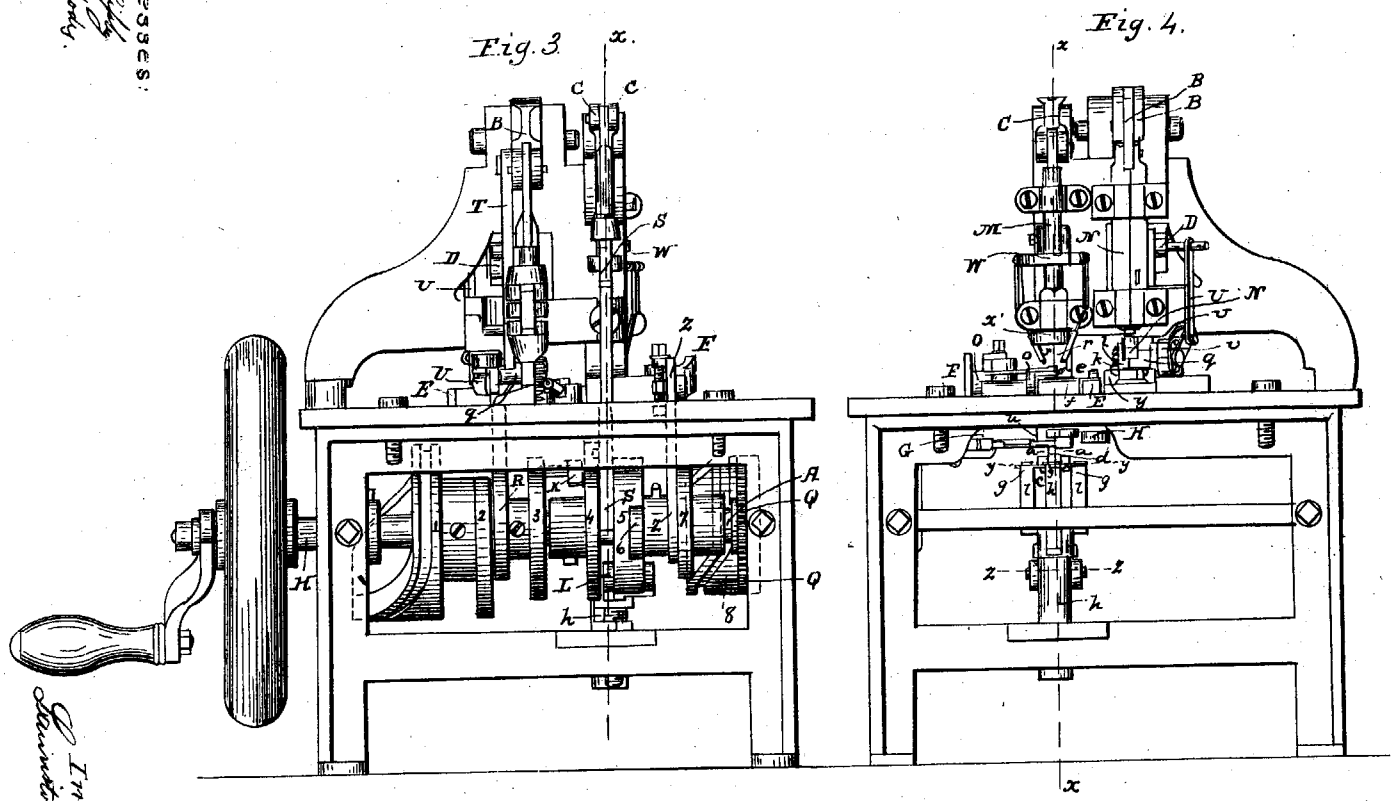
Witnesses:
James H. Ripley
W. B. Rhodes.
Inventor:
Lainston Towne
N. PETERS, Photo-Lithographer, Washington, D. C.

3 Sheets—Sheet 3.
L. TOWNE.
Machine for Making Ornamental Chains.
No. 928. Reissued March 13, 1860.
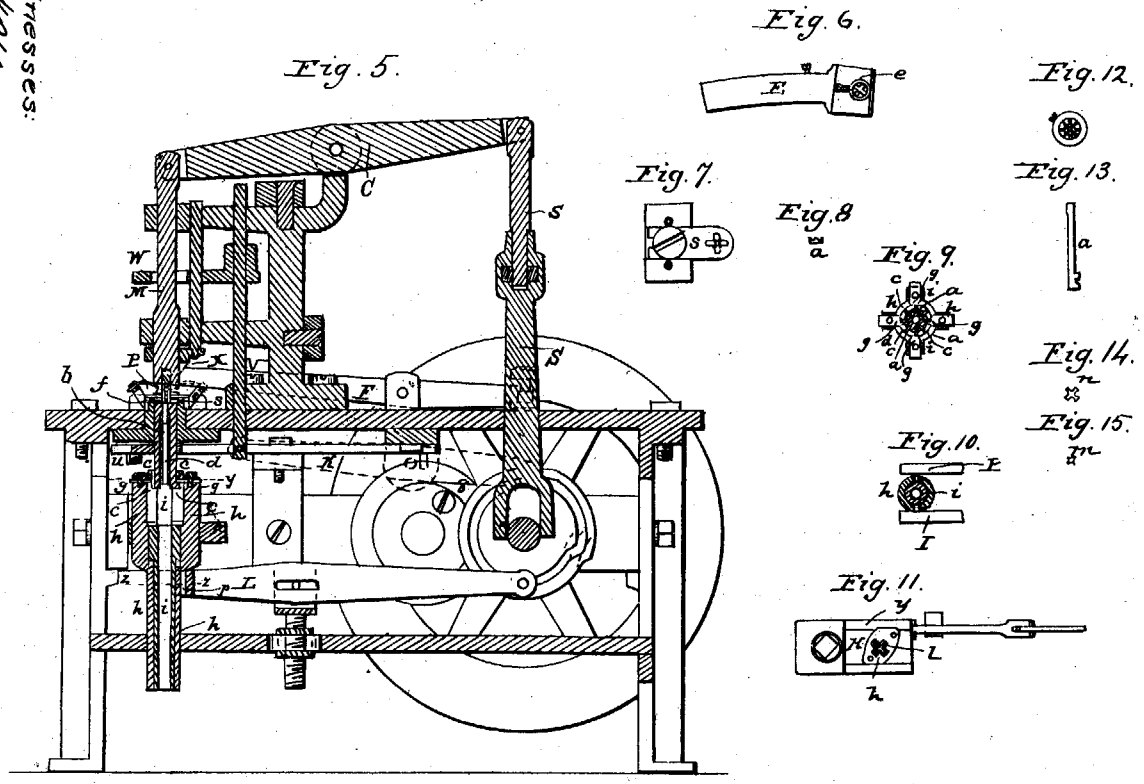
Witnesses:
James A. Rhody
H. B. Rhody
Inventor:
Lamartine Towne
N. PETERS, Photo-Lithographer, Washington, D. C.

UNITED STATES PATENT OFFICE.

LAURISTON TOWNE, OF PROVIDENCE, RHODE ISLAND.

IMPROVED CHAIN-MACHINE.

Specification forming part of Letters Patent No. 18,490, dated October 20, 1857; Reissue No. 928, dated March 13, 1860.

*To all whom it may concern:*

Be it known that I, LAURISTON TOWNE, of the city and county of Providence, in the State of Rhode Island, have invented a new and Improved Machine for Making Chains from Sheet Metal; and I do hereby declare that the following specification is a full, clear, and exact description thereof, reference being had to the accompanying drawings, making a part of the same.

Figure 2:
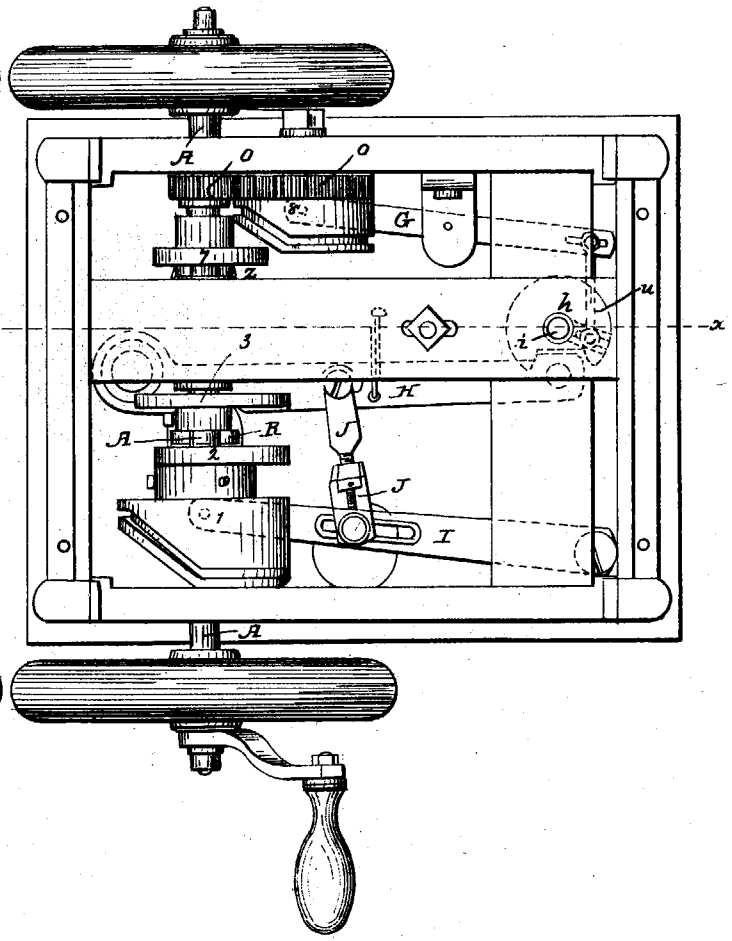
Figure 1:
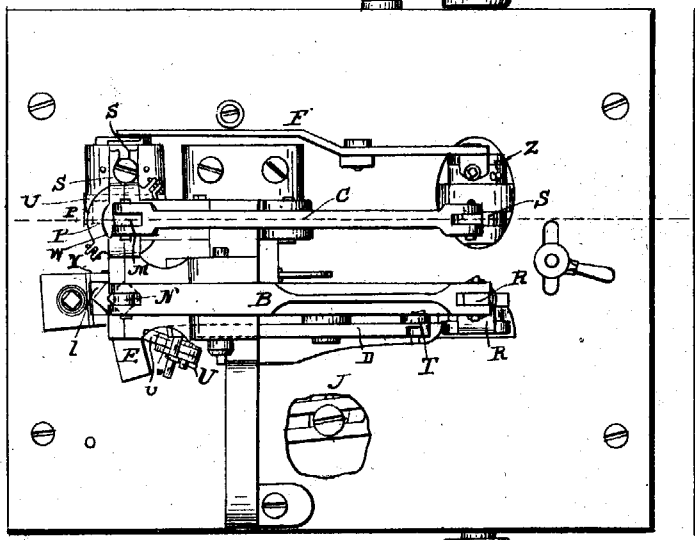

Figure 1 is a plan of the machine. Fig. 2 is a plan of the under side thereof. Fig. 3 is a rear elevation. Fig. 4 is a front elevation. Fig. 5 is a vertical section in the plane indicated by the line *x x*, Figs. 1, 2, 3, and 4. Fig. 9 is a section in the plane *y y*, Figs. 4 and 5. Fig. 10 is a section in the plane *z z*, Figs. 4 and 5. Figs. 6, 7, 11, 12, 13, 14, and 15 are views of parts detached.

Like letters designate corresponding parts in all the figures.

The functions performed by the machine include the whole process of cutting the links from the strips of metal and their subsequent bending and uniting till the whole complete chain is formed without the assistance or intervention of any manipulation.

All the working parts of the machine are mounted on a suitable frame, which is clearly represented in the drawings and needs no description. The movements are accomplished by the action of cams situated upon the driving-shaft A, except the cam 8, which, requiring to act only half as often as the other cams, is situated on a separate shaft, on which is a cog-wheel, Q, gearing into a pinion, O, of one-half its size on the main shaft.

The main shaft may be driven by power or by hand, and is provided with suitable fly-wheels to give steadiness to the motions.

From the cams suitable connecting-rods and levers communicate the desired motions to the proper parts, as hereinafter set forth.

The links are cut from strips of metal previously prepared for the purpose and fed in over the die *k*, which is secured in an adjustable seat, Y, arranged as shown in Figs. 1, 4, and 11. A cap, *l*, covers the die and holds the strips of metal in position while the cutter *n* is rising out thereof. The strips are drawn over the die by means of rollers *q q*, which are kept in motion by means of the ratchet-wheel and pawl *v* acting through the vibrating lever D and connecting-rods T U by the lever B. The cutter or punch *n* is situated in the lower end of a sliding rod, N, to which a reciprocating motion is communicated by the vibrating lever B, the movement being imparted thereto by the rod R, connecting with the cam 2 on the driving-shaft. Beneath the die *k* is situated a vibrating block, E, which I denominate the "carrier." This carrier receives each link as it is formed by the cutter and die *n k*, and conveys it to the part of the machine where the chain is formed.

The proper vibratory motion is imparted to the carrier by the vibrating arm H, which receives its motion through the connecting-rod J from the arm I, the latter being actuated by the cam 1, the whole being arranged substantially as shown in Fig. 2.

Instead of cutting the links from the strips of metal and depositing them immediately in the carrier, they may be formed in a separate machine and fed into the carrier by means of a suitable stack or feeding-tube. The form of each link in the present instance is indicated in Fig. 14, which represents the end of the punch or cutter *n* whereby the link is formed. The number of arms to each link is not essential, but the links always produce a chain of polygonal form, the number of sides or faces being double that of the arms in each link; hence links of four arms produce a chain of eight sides, those of three arms produce a chain of six sides, and thus in the same ratio for any number of arms.

The carrier E has a die or forming-aperture, *j*, of the same general shape as the link employed, but smaller than the link, so that the punch, in forcing the link through the die, causes the extremities of the arms to be bent up nearly at right angles, as shown in Fig. 8.

In order to keep the link in the proper place while the carrier is passing from one position to the other, a slight circular spring, *e*, is arranged on the carrier, as shown in Fig. 6, the spring being of such a size that, as the link is driven down upon the carrier, it will open and, grasping the link, hold it in the right position.

The punch *m*, which performs both the operations above described, (and a succeeding one presently to be described,) has two double reciprocating movements imparted to it at each revolution of the driving-shaft by means of a double cam, 4, actuating a rod, S, and thence through the vibrating lever C communicating the motion to the punch-rod M, substantially as represented in the drawings.

Directly under the punch *m* is situated the part which I call the "forming-guide"—that is to say, the device within which the chain is formed. In the machine described it consists of a tube, *d*, having an aperture, *b*, extending lengthwise through its center of sufficient diameter to enable the full-formed chain to be forced through it. In the present instance, however, as the machine shown in the drawings is intended to make that variety of chain which is known in the trade as "Adelaide chain," there is also attached to the forming-guide a set of slides, *a a*, equal in number to the number of sides to the chain, and located in radial grooves at uniform angles or distances apart, substantially as represented in Figs. 5, 9, and 12. The function which the forming-guide performs is to hold the chain so that the links can be properly deposited, and also to furnish a support during the operation of bending and clinching the arms of each link, while at the same time it permits the chain, as finished, to be transmitted to the box for receiving it beneath the machine.

Instead of the tube *d*, any equivalent device which can serve as a sustaining-guide may be employed—as, for instance, a ring or a plate with a central perforation for the passage of the chain would, in this combination, perform substantially the same functions as the tube described.

The slides above referred to as attached to the forming-guide are of the form shown in Fig. 13, the upper ends thereof reaching inward to the aperture of the tube *d*, but the remainder of their length reaching not quite into said aperture, so as to leave a portion of the substance of the tube inside, to keep it whole. On the outer edge of each slide, at the lower end, are projections *c c*, with a notch between them for the reception of projecting plates or lifters *g g*, Figs. 5 and 9, whereby a vertical reciprocating motion is given to each slide to the extent desired.

There are only one-half as many of the lifting-plates *g g* as there are slides *a a*, there being one to each alternate slide, as shown in Fig. 9. They are mounted on suitable standards *h h* and *i i*, the opposite ones being connected and moved together, but separate from the alternate ones. Thus, for convenience, the standards *h h* are united to or compose a tube or its equivalent at the bottom, while the other opposite standards, *i i*, are united to or form another tube, the one being represented in the drawings as within the other.

The standards *h h* receive their reciprocating movement from a lever, L, which is vibrated by a cam, 5, and the standards *i i* are in like manner moved by a lever, P, which is actuated by a cam, 6. The cam 5 begins to operate a little sooner than the cam 6, as shown in Fig. 5, but ceases its action nearly or exactly at the same time, so that the slides moved by the one set of lifters rise a little before those moved by the other set. Instead of the reciprocating slides *a a*, vibratory arms or pins, having vibratory motions on pivots, may be used to accomplish the same purpose; or any other equivalent convenient arrangement may be adopted.

The forming-guide tube *d* is connected, by a rod, *n*, with a vibrating lever, G, to which a vibratory motion is given by the cam 8. As this last-named cam revolves only half as often as the main shaft, there is only a half-vibratory movement or a vibratory movement in only one direction for each link. The extent of vibratory motion thus given to the tube *d* on its axis should be equal to the angular distance between two adjacent slides *a a*—as, for instance, if there are eight slides, the angular vibratory movement of the tube should be one-eighth of a circle, or forty-five degrees. The effect of this arrangement and movement of the forming guide is to cause one half only of the slides *a a* to be raised and lowered by each movement of the standards *h h* and *i i*, and the next time to raise and lower the alternate intervening slides, for, as is seen in Fig. 9, the lifters *g g g* only touch the alternate slides which in the succeeding movement of the standards take the positions of the intervening slides, while the latter assume the position of the former, and are in their turn acted upon.

A revolving angular movement of the tube may be substituted for the vibratory movement above described, the object being to cause the arms of the successive links composing the chain to interlock or to lie in alternate positions.

The slides *a a*, when in their lowest positions, reach nearly or exactly to the top of the tube *d*, and their inner upper corners are rounded, as shown in Figs. 5 and 13, so that their action upon the links may be smooth as well as effectual. Beneath the slides and close to the central aperture, *b*, small projections *f f*, &c., Figs. 5 and 12, extend upward from the tube a little above the slides, for the purpose of retaining the links in their proper position when placed upon the forming-guide, as above described. The link is held down thereon during the time in which the carrier is receding, and before any other means can be applied for the purpose, by the plate S, as shown in Figs. 1, 4, 5, but most distinctly in Fig. 7. This plate is situated immediately over the forming-guide, and has an aperture substantially of the form represented, there being inward projections between which the link is driven with a slight compression after its cross ends are bent up in the form shown in Fig. 8, and as soon as it passes down through the aperture said cross ends spring apart a little and are caught and held beneath said projections of the plate, as shown in Fig. 7.

As soon as the link is deposited in the position above specified, the carrier retreats to the position for receiving another link, and two or more slender rods or pins, *r r*, are caused to descend and bear upon the link. These rods slide in a holder, *x*, so as to converge in their descent, and their motion is imparted by the cam 3, through a vibrating lever, K, sliding rod V, and arm or plate W, with which the rods are connected by intermediate links or hinged rods, all substantially as shown in the drawings. The upper link being thus held down, the next movement is the ascent of two of the slides *a a*, caused by the action of the cam 5 through the lever L on the standards *h h*. This movement bends two arms of the link next preceding the link last deposited upward and partially inward over the last-deposited link. A set of fingers or bending-instruments, *p p*, now dart forward, actuated by the cam 7, through the vibrating lever F and connecting-rod Z, and bend down these two arms so as to clasp the upper link. Before the bending-instruments *p p* are withdrawn from the link the two slides *a a* beneath the two remaining arms of the next preceding link rise, and thereby bend said arms upward and inward toward the center. The bending-instruments *p p* and the holders *r r* being now withdrawn, the punch *m* descends farther than before and clinches these upper arms closely down upon the pair beneath, and thereby completes the formation of the link, at the same time forcing the whole chain down the forming-tube a sufficient distance to give place for the succeeding operation. The carrier now comes forward with another link, and the angular motion is given to the forming-guide below, in order to cause the arms of the succeeding link to alternate with those of the upper link of the chain. The movements above described are then repeated.

Instead of moving the forming-guide with the chain only a distance equal to the angular space occupied by each face of the chain, it might be moved three, five, or any uneven number of times that distance, so as to accomplish the alternating of the arms of the successive links. This is suggested, not because I consider that it would be preferable to or even so well as the simple method described, but to indicate a possible modification thereof.

The machine as above described is arranged so as to turn or vibrate the chain to receive the links in alternate positions for interlocking the arms thereof. Instead of thus turning or vibrating the chain, the links might be applied in alternate positions, while the chain would remain in a fixed position. This method would require the angular vibration or turning of the link-carrier or its equivalent, the punch *m*, the lifters *g g*, and fingers *p p*, or, if not the actual movement of all or any of them, a double number alternately put in action would be required. Such an arrangement would be more complicated, more difficult to arrange, and less desirable in many respects than the method of moving the forming-guide and chain; but it is the same in principle as and can be considered only as a modification of the method adopted and described.

To facilitate the adjustment of the several parts of the machine to each other, it will be observed that the several levers or their connecting-rods which transmit the motions from the cams are provided with suitable adjustments, substantially as represented. The same machine can also be made to make chain of different sizes by simply employing dies, punches, &c., corresponding to the size of the chain required.

I have thus, in order to enable those skilled in the art to make and use my machine, described with great particularity the construction of the several parts, and explained their relation to each other.

The general operation of the machine, regarded as a whole, may be thus expressed: The strip of stock having been presented to the machine, the punch *n* descends, and, cutting out a blank, deposits it in a recess in the carrier E, at that moment in waiting to receive it. The carrier then starts with the blank link and carries it to a point directly over the forming-guide *d*. The punch *m* now descends, and, forcing the link through a perforation in the bottom of the carrier, thereby giving the link a shape similar to that which it would receive if it had been struck up in a die, deposits it in the mouth of the forming-guide. The converging rods *r r*, or their equivalents, now descend and hold the link down, so that it will not be displaced by the succeeding operations. Two of the slides *a a* (if the link is of the particular form shown in the drawings) now rise and bend upward and inward two of the arms of the link immediately beneath the link last deposited. This done, the bending-instruments *p p* dart forward and bend down these two arms over the upper link. The two remaining slides now rise and bend upward and inward the two remaining arms of the immediately-preceding link, and, finally, the punch *m* again descends, completes the operations, and pushes the chain down the guide far enough to make room for the next link. In the meantime, and as soon as the punch is withdrawn from the carrier, after depositing the link in the tube, the carrier retreats to its first position under the cutter *n* and receives a new link. As it is about to start again for the forming-tube, the tube is vibrated the required distance, so that when the carrier is again over its mouth the position of the arms of the last link in the forming-guide is such that the arms of the link in the carrier will, when forced into the tube by the punch, interlock with them. The operations of bending and clinching previously described are then repeated.

I wish it to be expressly understood that my invention does not consist in the form of the punch which co-operates with the forming-tube, nor is it limited to the structure of the forming-guide; neither do I confine myself to any particular form or arrangement of the instruments for effecting, in combination with the forming-guide, the bending over of the arms, so long as the mode of operation is the substantial equivalent of that described; but What I do claim as my invention, and desire to secure by Letters Patent, is—

1. The combination of a punch, plunger, or other equivalent instrument with a forming-guide or its equivalent, substantially as described.

2. The combination of a forming-guide or its equivalent with the instruments co-operating with said guides or their equivalents, to effect the bending of the arms, substantially as described.

3. The combination of a die, *j*, Fig. 6, or its equivalent, for giving the first bend to the link with a forming-guide or its equivalent, substantially as described.

4. The combination of a carrier on which the link is transported with a forming-guide in which the link is deposited, or their equivalents, substantially as described.

5. The forming-guide for holding and transmitting the chain during the formation thereof, or its equivalent, substantially as described.

6. Giving to the forming-guide an angular or intermittent rotary movement upon its axis, so as to present the chain to the successive links in such positions that the arms thereof will alternately interlock.

7. The slender converging rods *r r*, or other equivalent instruments, for holding down the top link while the arms of the link next beneath are being bent over it, substantially as described.

8. The arrangement and operation of the slides *a a*, or their equivalents, substantially as described, so as to bend the arms of each link successively by pairs and cause the succeeding pair or pairs to overlap the preceding ones, or, in case the links have an odd number of arms, to cause the succeeding arms of each link to overlap the preceding ones singly in succession.

In testimony whereof I have hereunto set my hand this 21st day of February, A. D. 1860.

LAURISTON TOWNE.

Witnesses:

JAMES M. RIPLEY,
W. B. RHODES.